United States Patent [19]

Jones et al.

[11] Patent Number: 4,855,838
[45] Date of Patent: Aug. 8, 1989

[54] REMOTELY CONTROLLED PAN AND TILT TELEVISION CAMERA

[75] Inventors: David P. Jones, North Falmouth; William D. McElroy, Falmouth, both of Mass.

[73] Assignee: Cues, Inc., Orlando, Fla.

[21] Appl. No.: 199,425

[22] Filed: May 27, 1988

[51] Int. Cl.$^4$ .......................... H04N 7/18; H04N 5/30
[52] U.S. Cl. ..................................... 358/229; 358/210; 358/100
[58] Field of Search ................. 358/229, 210, 98, 100, 358/87

[56] References Cited

U.S. PATENT DOCUMENTS

| | | | |
|---|---|---|---|
| 2,632,801 | 3/1953 | Donaldson | 358/100 |
| 2,849,530 | 8/1958 | Fleet | 358/100 |
| 3,258,595 | 6/1966 | Galante | 358/210 |
| 3,780,224 | 12/1973 | Levine | 358/87 |
| 4,600,940 | 7/1986 | Sluyter | 358/229 |
| 4,639,772 | 1/1987 | Sluyter et al. | 358/229 |
| 4,713,697 | 12/1987 | Gotou et al. | 358/229 |

Primary Examiner—Jin F. Ng
Assistant Examiner—Stephen Brinich
Attorney, Agent, or Firm—Epstein & Edell

[57] ABSTRACT

An elongated remotely controlled pan and tilt television camera, ideally suitable for inspecting pipeline interiors, is able to be constructed with extremely small transverse dimensions due to the compact packaging of control mechanism disposed in the camera front end inside an optical dome. An outer gimbal is rotatable (i.e., panned) relative to the camera front end and is in the form of a frame within which an inner gimbal is mounted to be rotatable (i.e., tilted) relative to the outer gimbal. A lens, a lens focus control motor and a tilt motor are all mounted on the inner gimbal so as to be movable therewith. The pan motor is positionally fixed in the camera housing and rotates the outer gimbal by means of a drive cable and pulley secured to the outer gimbal. A CCD detector is located remotely from its associated electronics circuitry on a CCD circuit board secured to the inner gimbal so that the detector is movable with the lens and receives an optical image therefrom. The electrical signals representing the image and produced by the detector are processed into appropriate video format by circuitry disposed in fixed position within the camera housing. The lens is an automatic iris lens having its iris control circuitry located remotely from the lens so that a small lens structure may be employed. The CCD board serves as a tie point for all wiring between gimbal-mounted components and positionally fixed components disposed in the camera housing.

27 Claims, 12 Drawing Sheets

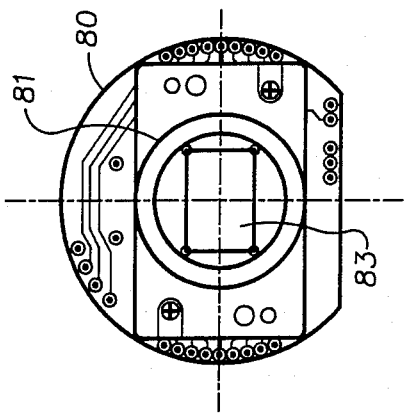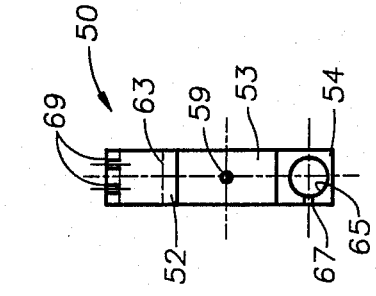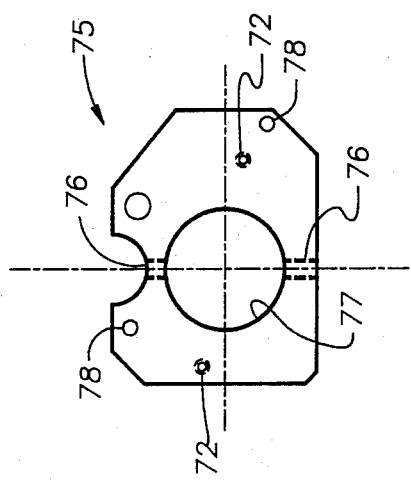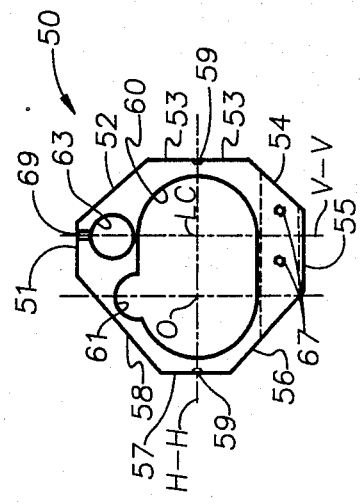

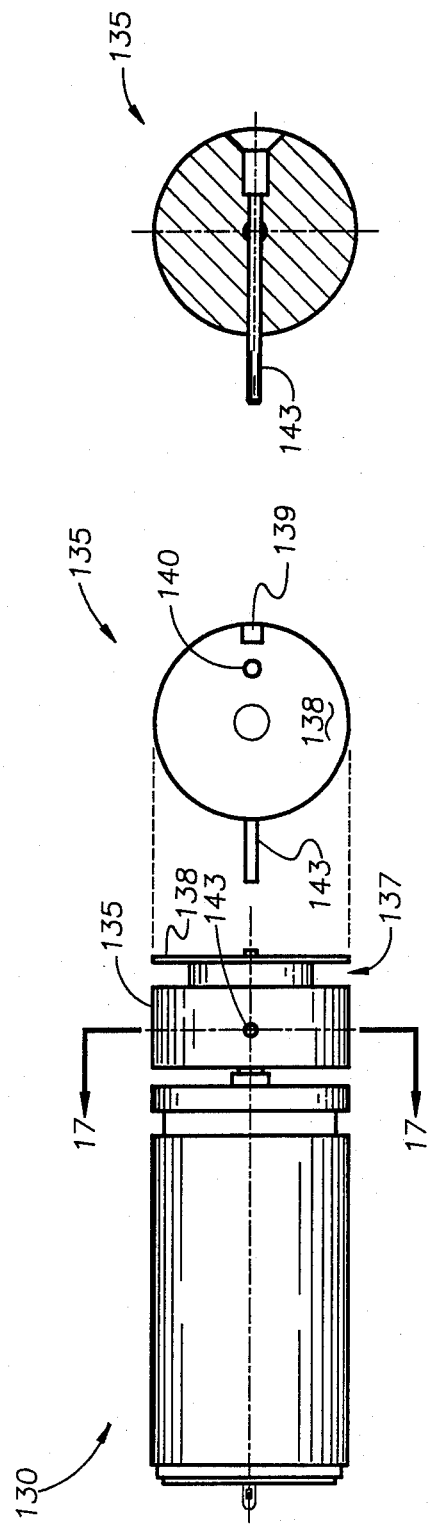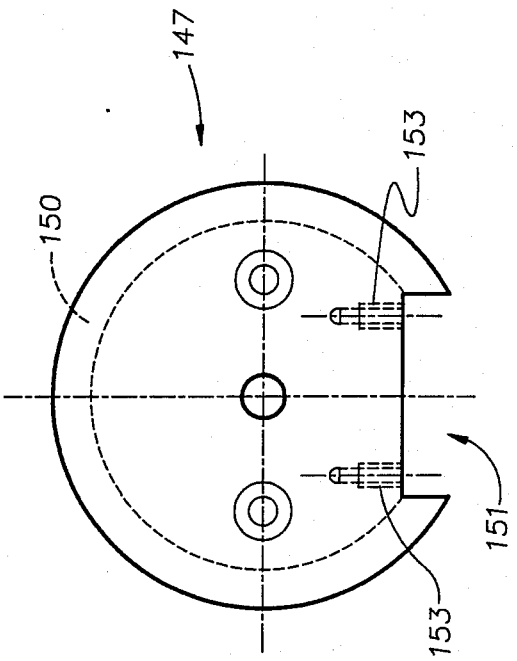

REMOTELY CONTROLLED PAN AND TILT TELEVISION CAMERA

BACKGROUND OF THE INVENTION

1. Technical Field

The present invention relates to remotely controlled television cameras and, more particularly, to very small television cameras capable of being utilized in pipeline inspection applications, which cameras are remotely controllable to vary the field of view, focus and opening of the camera lens. Although the television camera of the present invention has been developed primarily for use in visual inspection of pipeline interiors, it will be understood that the camera has a considerably wider range of applications.

2. Description of the Prior Art

It is known in the prior art to utilize television cameras to visually inspect the interiors of pipelines for leaks, defects, etc. An example of such utilization may be found in U.S. Pat. No. 3,750,711. Prior art television cameras used for this purpose tend to be too large to be utilized in narrow diameter pipelines, particularly when one considers that an illumination source must be provided with and attached to the camera. Attempts have been made to reduce the size of television cameras so that they may be useful for small pipelines, but such attempts have been commercially unsuccessful because of sacrifices that must be made in order to reduce the camera size. Specifically, for pipeline inspection applications, the camera must have a lens that is movable to direct the viewing coverage, or field of view, over the 360°-circumferential interior of the pipe. In addition, the focus and opening of the lens must be adjustable. All of these parameters must be controllable from a remote location at which the television image is viewed and from which the position of the camera in the pipeline may be controlled. Thus, it is possible to provide extremely small cameras without any capability of lens pan or tilt movement; however, a very wide angle lens must be employed to permit viewing over 360° of the pipe interior. Such very wide angle lenses produce significant distortion that is unacceptable for many applications.

Another consideration involved in reducing the size of a pipeline inspection camera is the need to permit independent control of pan and tilt movement of the lens, the focus of the lens, and the lens opening. It is not acceptable, for example, to permit the focus of the lens to be adjusted only in certain pan/tilt positions of the lens; or to permit the lens to be panned only for a particular tilt angle of the lens; etc.

The advent of CCD (charge-coupled devices) image transducers has permitted television cameras to be fabricated in very small sizes. The CCD detector assembly is positioned to receive optical images from the camera lens so that it can convert the components of the received image to corresponding electrical signals. Electrical circuitry associated with the detectors converts the image component signals to standard video signals for use by television receivers/monitors. Even with these CCD cameras, however, the degree of camera size reduction is limited because the CCD detectors must be positioned to receive the focused optical image from the lens. If the lens is to be movable, the CCD detectors and the CCD assembly must therefore also be movable. The result is that the weight of the CCD assembly puts a heavy burden on the pan and tilt motors. In addition, the size of the CCD assembly occupies so much space as to either limit pan/tilt range or limit the degree of size reduction that is possible.

OBJECTS AND SUMMARY OF THE INVENTION

It is therefore an object of the present invention to provide a television camera that can be made extremely small while having independent remote control over pan and tilt positioning of the lens, focusing of the lens, and the lens opening.

In accordance with the present invention a television camera is provided in which the lens is mounted on an inner gimbal that is pivotable relative to an outer gimbal about a first of two orthogonally-related axes. The outer gimbal is itself pivotable about the second axis so that the optical axis of the lens can be redirected by rotating either or both gimbals. Rotation about the first (e.g., horizontal) axis is effected by a tilt motor mounted on the inner gimbal in cooperation with a drive tilt gear positionally fixed on the outer gimbal. Rotation about the second (e.g., vertical) axis is effected by a positionally-fixed motor disposed rearwardly of the gimbals so as not to interfere with gimbal rotation. A focus control motor for the lens is also mounted on the inner gimbal.

The lens is of the automatic iris type with iris control circuitry located remotely from the lens assembly. Elimination of the iris control circuitry from the lens structure reduces the size of the lens and facilitates gimbal rotation within a minimal amount of space.

The camera utilizes CCD image detection but the CCD detector is removed from its electronic assembly and placed on a small CCD circuit board secured to the inner gimbal immediately behind the lens assembly so as to be movable therewith. The CCD electronic circuitry components are positionally fixed and disposed rearwardly of the gimbal-mounted equipment so as not to interfere with lens movement. The CCD circuit board also serves as a tie point for the wiring for gimbal-mounted components, including the wiring for the iris control, the focus control and the tilt motor control.

The stationary pan motor drives a pull wire or cable that in turn drives a pulley secured to the outer gimbal and centered about the vertical axis. The pull wire has its ends secured to respective locations on the pulley circumference so that the wire can rotate the pulley in one rotational direction or the other under control of the pan motor.

BRIEF DESCRIPTION OF THE DRAWINGS

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components, and wherein:

FIG. 7 is a view in plan of a lens mounting plate shown in FIG. 6;

FIG. 8 is a front view in plan of a CCD circuit board shown in FIG. 6;

FIG. 9 is a front view in elevation of the inner gimbal employed in the front end assembly of the camera of the present invention;

FIG. 10 is a side view in elevation of the inner gimbal;

FIG. 16 is a side view in plan and end view in plan of the pan motor assembly;

FIG. 17 is a view in section taken along lines 17—17 of FIG. 16;

FIG. 18 is a view in plan of a driven pan pulley;

DESCRIPTION OF THE PREFERRED EMBODIMENT

Figure 1:
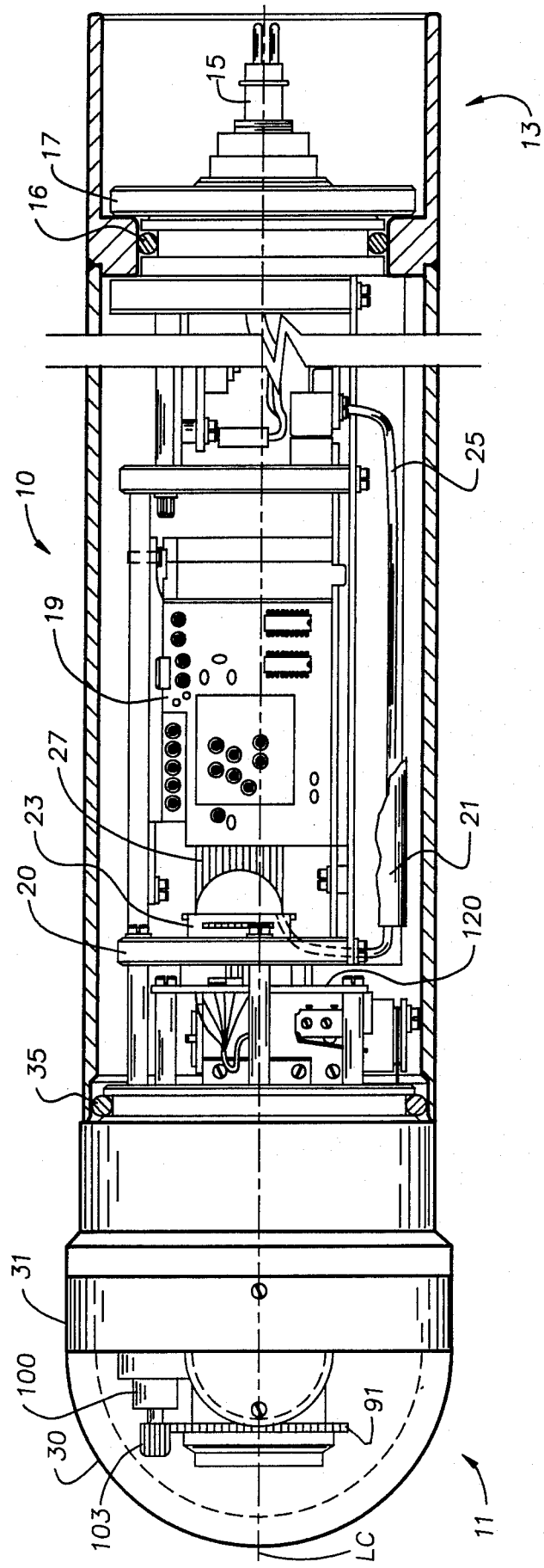
FIG. 1 is a view in elevation and partial section of a pan and tilt television camera constructed in accordance with the principles of the present invention.

Referring specifically to FIG. 1 of the accompanying drawings, a television camera constructed in accordance with the present invention includes a cylindrical housing 10 for electronic components having a closed front end assembly 11 and a back end portion 13 welded to housing 10. The housing has a longitudinal Centerline (LC) constituting the longitudinal axis of the camera assembly. Housing 10 is made of suitable metal or plastic material and, in the preferred embodiment, is made of stainless steel. Disposed between the front and back ends is an intermediate housing portion containing the electronic components for the television camera and for controlling the position, focus and iris of the camera. The camera typically is controlled from a remote location at which the video image is viewed, and all electrical control and video signals passed between the housing 10 and the remote location are connected via cables that connect to plugs 15 disposed in the back end portion 13 of the housing. The hollow back end portion 13 of the housing peripherally surrounds plug 15 and is sealed from the components in the intermediate portion of the housing by an o-ring 16.

The forward end of the intermediate portion, terminated by front plate 20, houses the television camera electronic assembly 19 and is surrounded by a tubular insulator 21 made of Mylar, or the like. An electrical connector 23 is mounted on the rear side of front plate 20 and has electrical wires from front end assembly 11 connected thereto. A ribbon cable 25 is connected to connector 23 and conducts electrical signals to the electronic camera control components housed rearwardly of the camera electronics assembly 19. Electrical connections between front end assembly 11 and the camera electronics are provided by cable 27.

The camera electronics assembly 19 may be, for example, the color CCD (charge-coupled device) camera sold by Sony as Model XC-117. In this application of that assembly the CCD sensor 81 (see FIG. 6) is removed from assembly 19 and secured to printed circuit board 80. That board also functions as a tie point for the wiring for the gimbal-mounted focus and tilt motors and for the automatic iris lens.

Front end assembly 11 is illustrated in FIGS. 2 through 6 to which specific reference is now made. The forward part of front end assembly 11 is covered by an optical dome 30 of generally hemispherical configuration secured to the forward end of generally hollow cylindrical section 31. Dome 30 is fabricated from optically clear acrylic plastic and has a rearwardly-extending rim that overlies a forwardly-extended rim of section 31 so that the two rims may be secured to one another by a plurality of radially-extending screws 33. Hollow section 31 is typically made of the same material as housing 10 and has a reduced diameter rear rim with an annular channel in which an O-ring 35 is disposed. The forward annular lip of housing 10 overlies this channel and O-ring 35 in a snug fit and is secured to section 31 by means of nut 17 which fixes the internal chassis to the outer housing 10.

An outer gimbal 37 is disposed in front end assembly 11 for rotation about a vertical axis V-V extending transversely through the longitudinal centerline LC of the camera assembly. To facilitate an understanding of the present description, the terms vertical and horizontal are employed in accordance with the camera orientation illustrated in FIGS. 2 and 4, and for many applications the camera will only be used in that orientation. However, it will be appreciated that there are some applications for the camera in which the longitudinal axis LC is not constrained to remain horizontal, and/or where the pivot axes for controlling the camera field of view are not limited to vertical and horizontal. Outer gimbal 37 is a plate-like frame having an outer edge that is a truncated circle. In particular, the outer edge of gimbal 37 is circular along the top 39 and one side 40 with a radius of curvature slightly smaller than that of the front end assembly and centered on the longitudinal axis LC of the camera assembly. The outer edge of gimbal 37 at opposite side 41 and at the bottom 43 is formed in straight lines that ar connected by a further arcuate section 45. The outer gimbal is mounted for pivotable movement by means of a pair of set screws 47 disposed in suitably-provided radially-extending conical bores formed in respective bearing members 48 at the top 39 and bottom 43 of the gimbal. Each set screw 47 has a smooth conical tip received in a respective bearing member 48 and is threadedly engaged in a suitably tapped bore extending through the forward rim of hollow section 31. Since the tapped bores for set screws 47 in section 31 are covered by optical dome 30, the set screws 47 are inserted before the dome is secured to hollow section 31. The conical tips of set screws 47 freely rotate in the conical bores in bearings 48 to permit the outer gimbal to rotate freely about vertical axis V-V defined by the set screws and extending transversely of longitudinal axis LC.

An inner gimbal 50, illustrated in detail in FIGS. 9 and 10, takes the form of a plate having transverse dimensions (i.e., transverse to the camera assembly longitudinal axis LC) that permit gimbal 50 to fit inside the frame defined by outer gimbal 37 so as to be rotatable about horizontal axis H-H relative to the outer gimbal. The thickness of inner gimbal 50 (i.e., the dimension along longitudinal axis LC) is substantially greater than that of the outer gimbal 37 and, in an actual embodiment, for example, the thickness of the outer gimbal 50 is 0.250 inches whereas the thickness of the inner gimbal 37 is 0.562 inches. The periphery of inner gimbal 50 is sub-divided into eight straight-edge sections 51–58, respectively, of different lengths and arranged such that, in the aforesaid actual embodiment adjacent sections interact at an angle of 135° and have the following respective length dimensions (in inches) beginning with the top section 51 and proceeding clockwise, as viewed in FIG. 9: 0.487; 0.884; 1.000; 0.778; 0.672; 0.994; 0.624; and 1.150. The two side sections 53 and 57 have conical bores 59 countersunk radially therein to establish pivot axis H-H extending in transverse intersection with longitudinal axis LC. Pivot access H-H bisects the edge sections 53 and 57 of the inner gimbal. An opening 60 is defined through the thickness of inner gimbal 50 and takes the form of two semi-circles spaced by a rectangular portion, the radial centers of the semi-circles lying on the horizontal pivot axis H-H. The center of the semi-circle closest to inner gimbal edge section 53 lies on the longitudinal centerline LC for the camera assembly. The center of the other semi-circle in opening 60 is vertically aligned with the center of a semi-circular projection 61 at the periphery of opening 60 proximate edge section 58. Typically, the radius of curvature for the two larger semi-circles in opening 60 is 0.562 inches whereas the radius of curvature for projection 61 is typically 0.188 inches. Another through-opening 63 defined in inner gimbal 50 is of circular configuration and disposed above opening 60 with its center vertically aligned with longitudinal axis LC. A horizontally-extending cylindrical channel 65 is defined widthwise through inner gimbal 50 from edge section 56 to edge section 54 just below opening 60. The diameters of opening 63 and channel 65 are typically 0.397 inches. Two tapped bores 67 extend from the forward surface of gimbal 50 into channel 65. Two additional tapped bores 69 extend into opening 63 from the top edge section 51.

Figure 4:
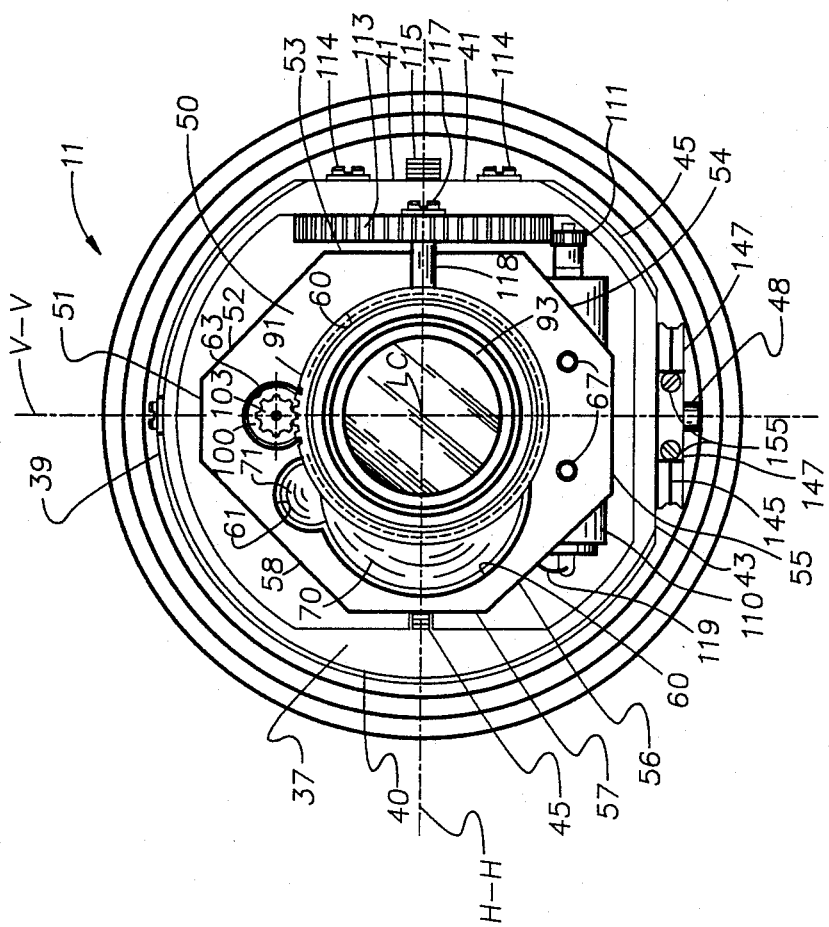
FIG. 4 is a front view in elevation of the head portion illustrated in FIG. 2.
Figure 6:
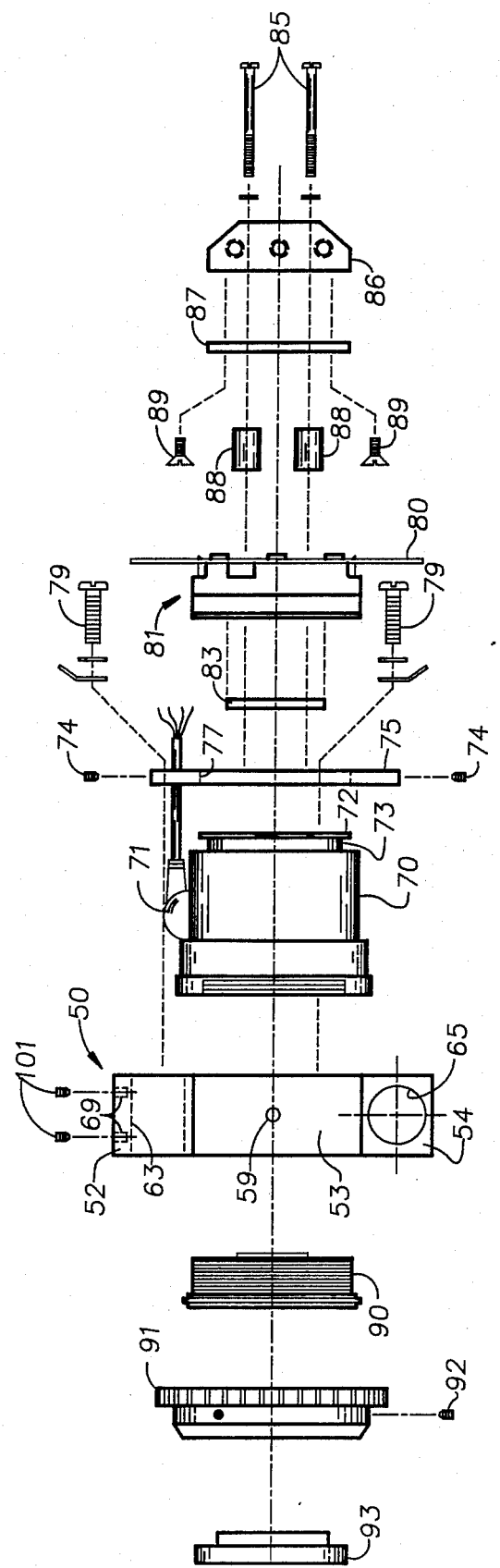
FIG. 6 is an exploded side view of the lens assembly and related components located in the head portion illustrated in FIG. 2.

Referring to FIGS. 4 and 6 of the accompanying drawings, a lens assembly 70 is adapted to fit in and extend longitudinally through opening 60 in inner gimbal 50. Lens assembly 70 may, for example, be Sony Model VCL 08 SBYA. A cable connector portion 71 of the lens assembly fits in projection 61 of opening 60. The positioning of the lens assembly is such that its optical axis is coaxial with the longitudinal axis LC of the housing 10 when outer gimbal 37 and inner gimbal 50 are both in their neutral positions (i.e., in vertical planes perpendicular to longitudinal axis LC). The rearward end of lens assembly 70 terminates in an annular flange 72 spaced from the main body portion of the lens by an annular channel 73 of reduced diameter. A lens mounting plate 75, illustrated in detail in FIG. 7, has a circular through-hole 77 defined therein, the diameter of which is the same as, or slightly larger than, the diameter of flange 72 but smaller than the diameter of the main body portion of the lens assembly 70. Two holes 78 are drilled through plate 75 on opposite sides of hole 77. Holes 78 are longitudinally aligned with respective tapped bores located in the rearward surface of inner gimbal 50 such that screws 79 can extend through holes 78 and be received in the tapped bores to secure lens mounting plate 75 to the inner gimbal. Appropriate hardware, such as lugs and washers, are provided in conjunction with screws 79. When thusly secured to inner gimbal 50, lens mounting plate 75 is disposed in alignment with annular channel 73 of the lens assembly; additionally, the forward surface of lens mounting plate 75 abuts both the rear surface of inner gimbal 50 and the annular shoulder of the lens housing that forms the forward wall of channel 73. Two tapped radially-extending through-holes 76 extend from the top and bottom edges of plate 75 to hole 77. Tapped holes 76 are vertically aligned and receive respective set screws 74 that are adjusted to bear radially against the lens assembly 70 at diametrically opposite sides of channel 73.

Referring to FIGS. 6 and 8, disposed rearwardly of lens mounting plate 75 is a printed circuit board 80 on the forward side of which is mounted a CCD (charge-coupled device) block 81. CCD block 81 may, for example, be a Sony Model A-7560-026A which functions to convert optical images received from lens assembly 70 into electrical video signals. In this regard block 81 is positioned such that lens assembly 70 focuses its received optical signals on the forward surface of block 81. An infrared filter 83 is disposed between lens 70 and block 81. Printed circuit board 80 is secured to lens mounting plate 75 by means of a pair of mounting screws 85 extending forwardly through a clamp block 86, clamp disk 87, spacers 88, printed circuit board 80 and CCD block 81 to be engaged in tapped bores 72 at the rearward surface of lens mounting plate 75. Clamp block 86 and clamp disk 87 are secured to one another in abutting relation by means of screws 89 to serve as a clamp assembly.

The forward end of lens assembly 70 has an annular lens front element 90 threadedly engaged therewith. Annular lens focus gear 91 is secured circumferentially about front element 90 by means of plural radially-extending set screws 92. A forward infrared filter 93 is threadedly engaged to the forward end of focus gear 92.

All of the elements illustrated in FIG. 6 are secured to inner gimbal 50 and are thus rotatable with that gimbal member. In this manner the lens assembly 70 can have its field of view directed in accordance with the tilt position of the inner gimbal 50. Since inner gimbal 50 is secured to and movable with outer gimbal 37, the lens assembly is also movable in pan as the outer gimbal 37 is rotated. Electrically wiring 95 from the gimbal mounted components is secured at clamp 86, 87 and extends rearwardly from front end 11 into cylindrical housing 10 with enough slack to accommodate the pan and tilt rotation of the lens assembly.

Figure 2:
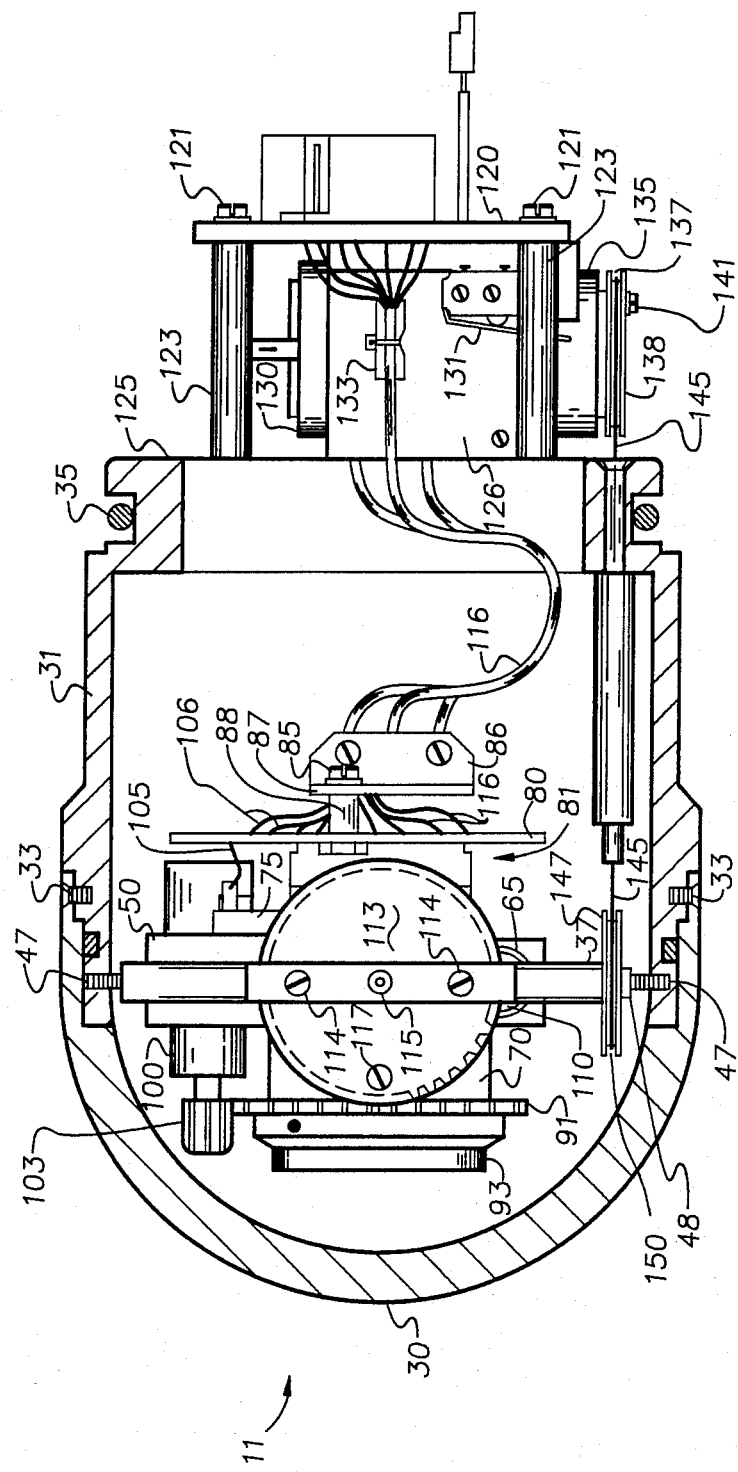
FIG. 2 is a view in elevation and partial section of the front end portion of the television camera illustrated in FIG. 1.
Figure 12:
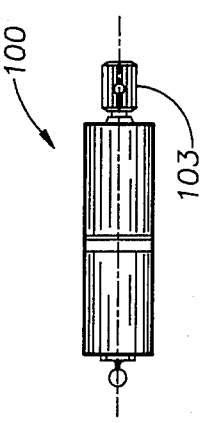
FIG. 12 is a plan view of the focus control motor.

Referring to FIGS. 2 and 4, and additionally to FIG. 12, a focus motor 100 is mounted in opening 63 in inner gimbal 50. Specifically, two radially-extending set screws 100 (FIG. 6) extend through tapped bores 69 into opening 63 to secure focus motor 100 in place. The drive shaft for the focus motor 100 is oriented parallel to the optical axis of lens assembly 70 and has its forward end terminated in a drive gear 103 positioned to engage and rotate focus gear 91 about the lens optical axis. Electrical connections 105 for operating the focus motor and the lens iris are secured to the CCD board 80 from which continuing wires 106 extend and are secured to clamp 86, 87 and pass rearwardly into the cylindrical housing 10. It will be appreciated that the focus of lens assembly 70 can be selectively adjusted by means of focus motor 100.

Figure 13:
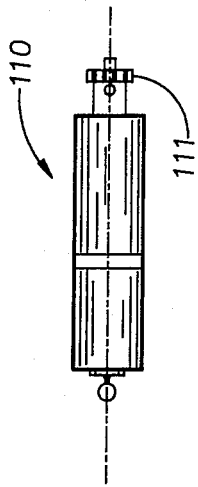
FIG. 13 is a plan view of the till motor.

Referring now to FIGS. 4 and 13, a tilt motor 110 is mounted in transverse channel 65 of inner gimbal 50. Motor 110 is secured in place in channel 65 by means of set screws extending through tapped bores 67 into engagement with the motor casing. The drive shaft for motor 110 extends transversely of the optical axis of lens assembly 70 and terminates in a drive gear 111 positioned to engage a driven tilt gear 113 fixedly secured to outer gimbal 37. More precisely, driven tilt gear 113 is secured by means of screws 114 flush against the inner surface of side 41 of outer gimbal 37 with the center of the gear disposed on horizontal axis H-H. Rotation of drive gear 111 by motor 110 causes the drive gear to ride along the driven gear 113 to thereby cause the inner gimbal 50 to rotate about horizontal axis H-H relative to the outer gimbal 37. In this regard pivot screws 115 extend radially along axis H-H through sides 40, 41 of outer gimbal 37 such that their conical ends are engaged in respective conical bores 59 in the outer periphery of inner gimbal 50. Rotation of inner gimbal 50 relative to outer gimbal 37 is limited by a stop screw 117 extending horizontally and through the driven gear 113 so as to abut the front surface of inner gimbal 50 at the extreme positions of tilt movement of the camera. The shaft of stop screw 117 is preferably surrounded by rubber or plastic tubing to prevent metal-to-metal contact with the inner gimbal at the extreme tilt positions. Wiring 119 for controlling operation of the tilt motor 110 is connected to the CCD board 80 from which continuing wires 116 pass via clamp 86, 87 to the cylindrical housing 10. A printed circuit board (not shown) containing the circuitry for the tilt motor 110 is located within housing 10.

Figure 3:
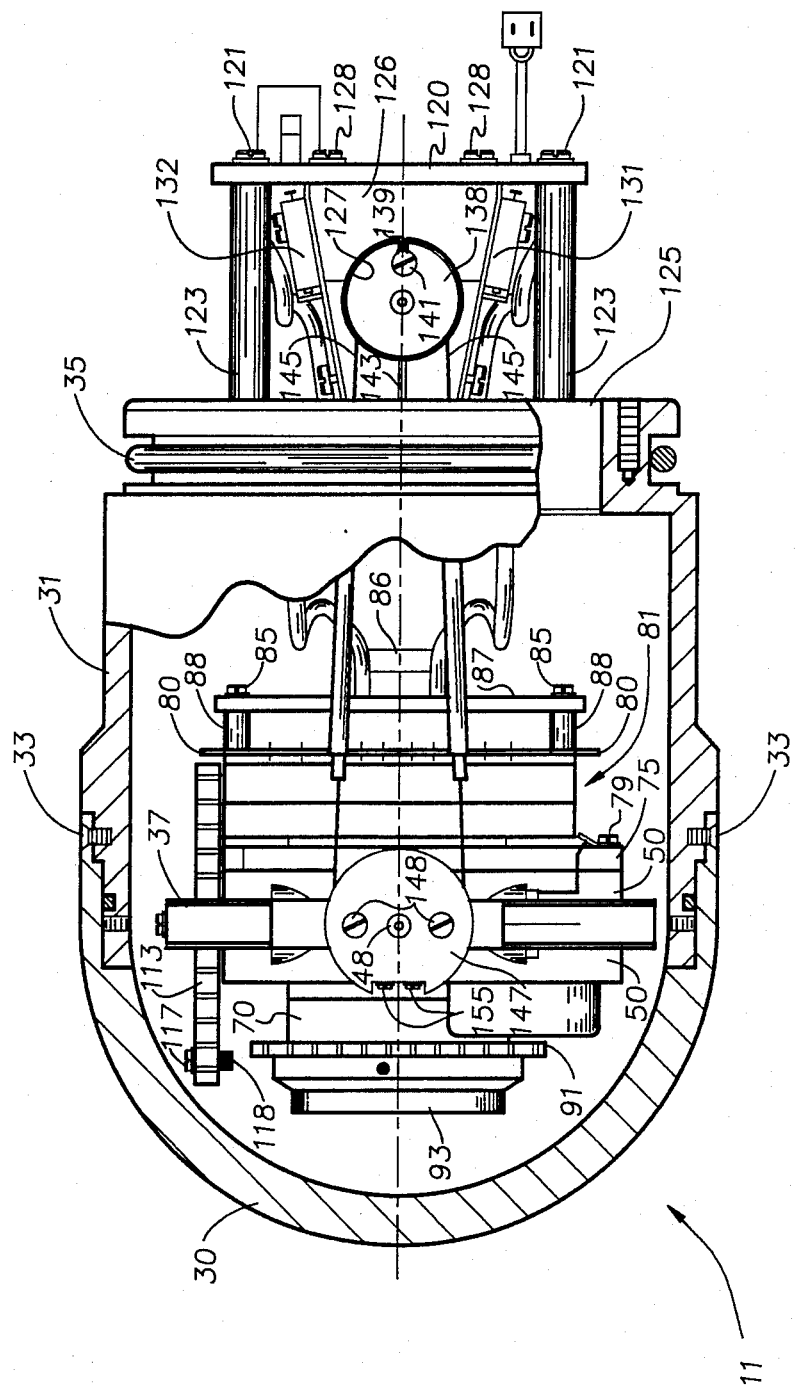
FIG. 3 is a bottom view in plan and partial section of the head portion illustrated in FIG. 2.
Figure 5:
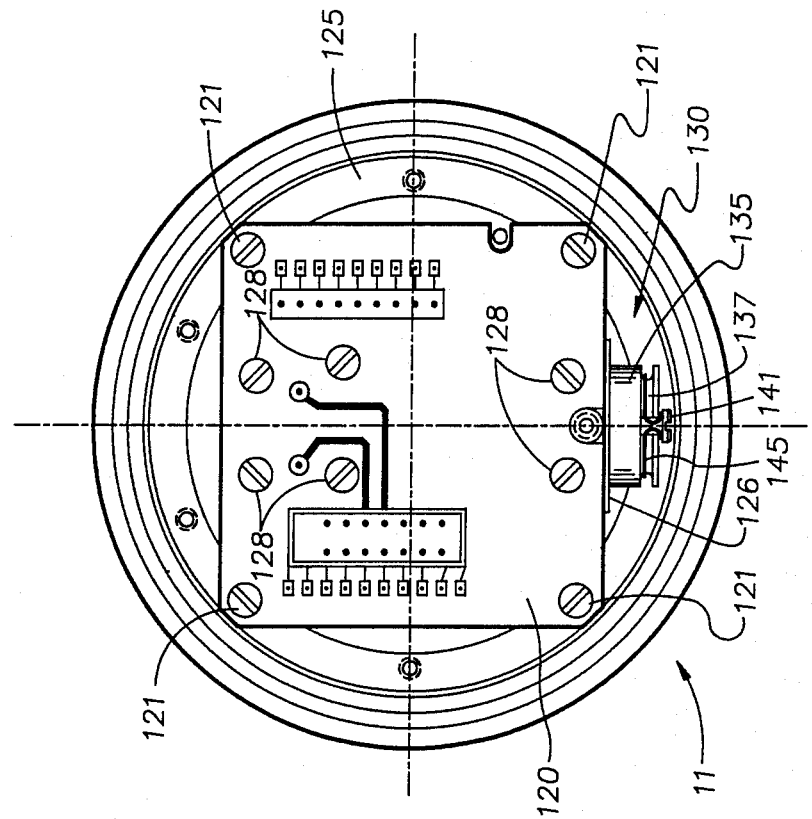
FIG. 5 is a rear view in elevation of the head portion illustrated in FIG. 2.
Figure 15:
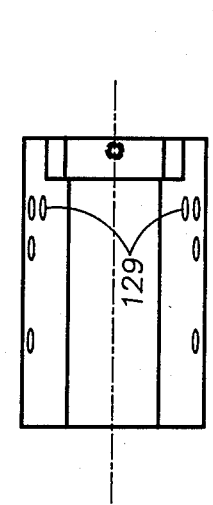
FIG. 15 is a front view in elevation of the pan motor mounting block.
Figure 14:
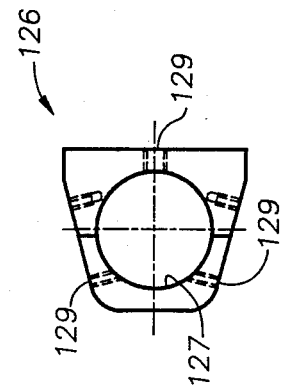
FIG. 14 is a side view in elevation of a pan motor mounting block.

A pan printed circuit board 120, as best illustrated in FIGS. 2, 3 and 5, is suspended in vertical orientation rearwardly of front end 11. The board 120 is supported by means of plural screws 121 extending through respective spacers 123 and engaged in respective tapped holes in a rearwardly facing annular flange 125 of cylindrical section 31. Circuitry for controlling the operation of the pan motor is contained on printed circuit board 120. Mounted on the forward facing side of board 120 is a pan motor mounting block 126 illustrated in detail in FIGS. 14 and 15. The base of mounting block 126 is mounted flush against board 120 by means of screws 128 (see FIGS. 3 and 5) extending through board 120 and engaged in tapped bores (not shown) in the block 126 base. The sides of block 126 taper in a forward direction and extend past flange 125 into the front end 11. A vertically oriented cylindrical bore 127 extends entirely through mounting block 126 and is sized to receive the cylindrical casing of the pan motor 130 (see FIGS. 16, 17). A plurality of tapped holes 129 extend from the sides of the block 126 to the mounting bore 127 and are adapted to receive set screws (not shown) that bear against the motor casing and hold it in place in bore 127. Additional tapped holes ar provided in the block 126 to permit various components, such as limit microswitches 131, 132 and cable clamp 133 to be mounted along its sides with appropriate screws. When thusly mounted, motor 130 has its drive shaft extending vertically and transversely of the longitudinal axis LC of the camera housing. The lower end of the drive shaft has a drive pulley 135 secured thereto. Drive pulley 135 has a generally cylindrical configuration with an annular channel or recess 137 of reduced diameter disposed proximate its distal end. The distal end is in the form of an annular flange 138 having a slot 139 extending radially inward from its rim to the radial depth of annular channel 137. A tapped hole 140 is also defined in flange 138 at a location radially inward of channel 137 and is adapted to receive a cable mounting screw 141. Tapped hole 140 and mounting screw 141 are located between and in radial alignment with slot 139 and the motor drive shaft.

A stop pin 143 extends radially from drive pulley 135 at a location such that it contacts and actuates microswitches 131 and 132 at predetermined limit positions of the drive shaft rotation for motor 130. The stop pin 143, as best illustrated in FIG. 17, extends diametrically across the drive pulley 135 in a suitably provided bore. A portion of the bore diametrically opposite the projecting end of pin 143 may be threaded to engage a suitably threaded portion of the pin near its proximal end. Alternatively, pin 143 may be secured at its proximal end to pulley 135 by means of a suitable adhesive, or the like.

A pan drive cable 145, in the form of a steel wire that may be provided with a suitable plastic sleeve, extends between drive pulley 135 and a driven pulley 147. The driven pulley 147, as best illustrated in FIG. 3, is secured to the outside surface of the bottom of outer gimbal 37 by means of screws 148, or the like, and is centered about bottom bearing 48 on vertical axis V-V. Driven pulley 147, which is illustrated in detail in FIG. 18, has two circular flanges with a circumferential annular slot 150 disposed therebetween to serve as a track for cable 145. A portion of each of the two flanges is cutaway at the forward end of pulley 147 to define a cable connection region 151 at which the annular slot is flattened. Two tapped bores 153 extend perpendicularly inward from this flattened portion and receive terminal screws 155 about which respective ends of cable 145 are wound and secured. The cable extends along both sides of driven pulley 147 to drive pulley 135 where it resides in channel 137. The longitudinal center of the cable is pulled through slot 139 at the rearward end of pulley 135 and is secured on the outer surface of flange 138 by means of screw 141. As drive pulley 135 is rotated by the drive shaft of motor 130, the drive cable 145 is pulled one way or the other to rotate driven pulley 147 accordingly about bearing 48. Rotation of driven pulley 147 causes concomitant rotation of the outer gimbal 37 to which pulley 147 is secured.

From the foregoing description and the drawings it will be appreciated that the lens assembly 70 is movable independently in pan (about a vertical axis) and tilt (about a horizontal axis) and that the lens focus can also be adjusted independently. The tilt motor 110 and focus control motor 100 are supported on inner gimbal 50 which, under the control of tilt motor 110 and tilt gear 113, is independently movable relative to the outer gimbal 37. The pan motor 130 is mounted rearwardly of front end 11 and controls movement of outer gimbal 37. As outer gimbal 37 is rotated about vertical axis V-V it carries the inner gimbal 50 with it to change the pan angle of the field of view of lens assembly 70. For any pan angle, tilt motor 110 can be energized to tilt the inner gimbal 50 relative to the outer gimbal to thereby change the tilt angle of the optical axis. For any pan angle and any tilt angle the focus control motor can be energized to change the focus of the lens along the optical axis. As is described below, the pan and tilt motors can be energized simultaneously to effect diagonal movement of the len optical axis. Further, the focus control motor may be operated simultaneously with one or both of the pan and tilt motors.

Lens assembly 70 is an automatic iris lens that does not contain its own iris electronic control circuit. By utilizing a lens that does not contain its own electronic control circuit, the lens can be small enough to fit within the small diameter front end 11 required for the camera of the present invention. Instead of being located in the lens itself, the iris control electronics are contained in camera electronic assembly 19 disposed within housing 10, as described above.

Figure 11:
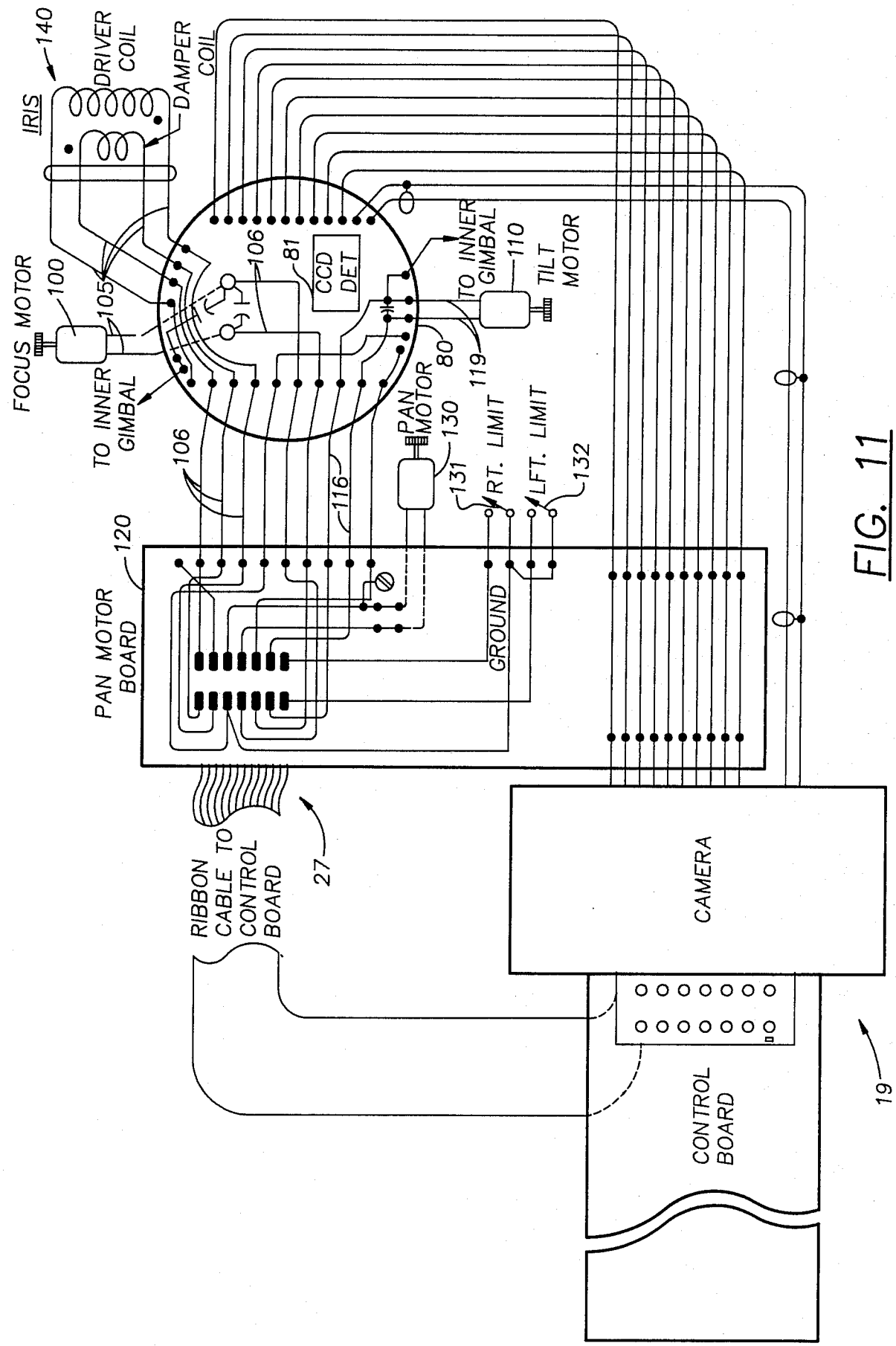
FIG. 11 is a wiring diagram showing how the CCD board functions as a tie point for gimbal-mounting components.

Referring now to FIG. 11, an important feature of the present invention, enabling the camera to be constructed in its very small size, is the use of the CCD printed circuit board 10 in the front end assembly to mount the CCD sensor 81 proximate the lens assembly, and also to serve as a location for tie points for the wiring used to control the focus motor 100, the tilt motor 110 and the auto iris coils 140 located in lens assembly 70. In this regard, the pan control board 80 is secured to and movable with the inner gimbal 50 so that the wiring from the board 80 to the camera electronics assembly 19 contains sufficient slack to accommodate the full range of pan and tilt variation. FIG. 11 schematically illustrates the manner in which the pan control the board 80 serves these functions. The focus control motor 100 is controlled by wiring cable 105 leading from board 80 to the motor. Cable 105 also carries the connections from board 80 to the iris control coils 140 in lens assembly 70. These wires are tied on the movable CCD board 80 and are connected via slack wiring cable 106 to the pan motor board 20 which is not movable with the gimbals. Cable 119 carries wires from the CCD board 80 to tilt motor 110; the slack cable 116 carries wires from movable CCD board 80 to the positionally fixed pan motor board 120. The pan motor 130 is not movable with the gimbals but is uniquely positioned so as to drive the outer gimbal by means of the drive cable 145 and driven pulley 147 secured to the bottom of the outer gimbal. Also illustrated in FIG. 11 is wiring for the pan limit switches 131, 132 and the cable 27 that provides connections between the pan motor board 120 and the camera electronics assembly 119.

Figure 21:
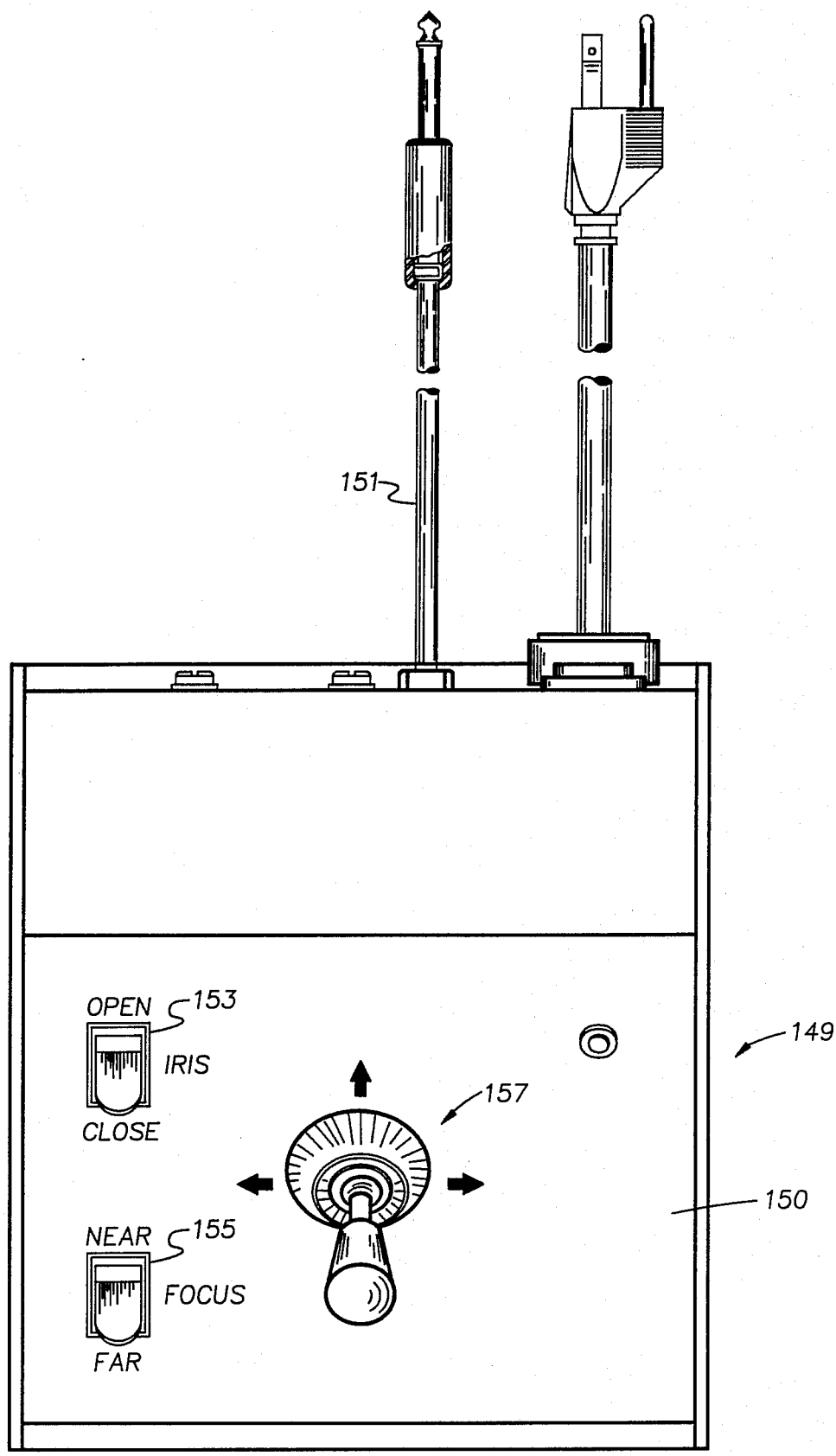
FIG. 21 is a top view in plan of a manual controller used to control the position, focus and opening of the camera lens.

Referring to FIG. 21, manually-operated controls for the various motors and the lens iris are disposed on a panel 150 of a controller 149 located remotely from the camera assembly. The controller is electrically connected to the camera assembly by means of a long cable of which cable 151 is a part. An iris control switch 153 has neutral, OPEN and CLOSE positions. This switch changes the reference voltage to the iris drive circuit. When in the OPEN position, switch 153 causes the auto iris to widen its opening; when in the CLOSE position, switch 153 narrows the lens iris opening. When switch 153 is in the neutral position the iris will adjust to light changes using the reference voltage to determine how far to widen or narrow. A similar three-position switch 155 is provided to control the focus control motor. When moved from its neutral position to its NEAR position, switch 155 operates motor 100 to focus the lens at a point closer to the camera. In the FAR position of switch 155, motor 100 focuses the lens at a location that is further from the camera.

A common pan and tilt control element 157 controls operation of the pan and tilt motors. Control element 157 is a four-way joystick-type switch having a neutral position in which neither motor is energized. When control element 157 is moved vertically up or down, tilt motor 110 is energized to move the inner gimbal 50 to tilt up or down, accordingly. When element 157 is moved left or right, pan motor 130 is energized to pivot the outer gimbal 37 to the left or right, accordingly. Both motors can be simultaneously actuated by moving element 157 to a diagonal position (e.g., up and to the left, etc.) to effect diagonal movement of the optical axis.

Figure 19:
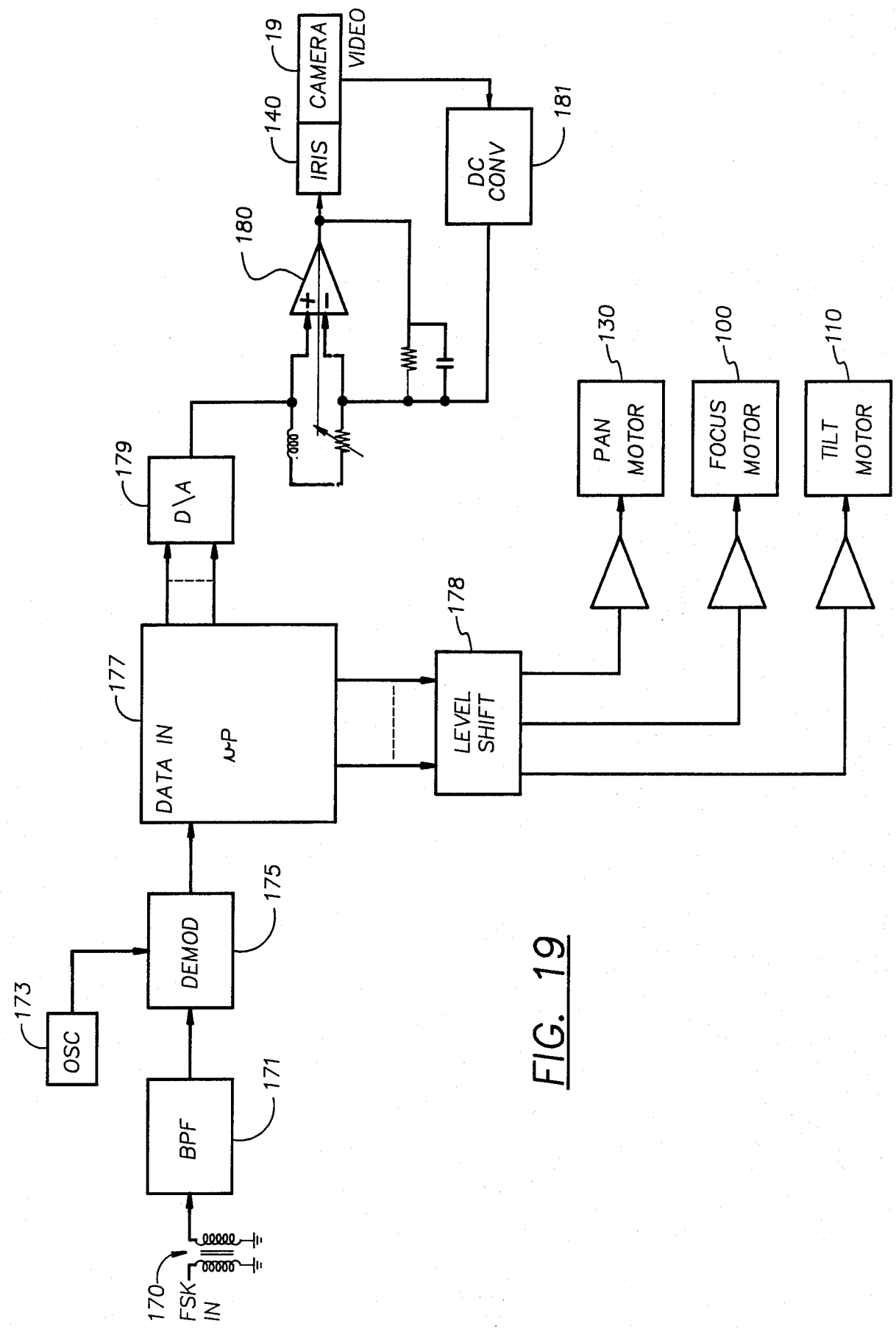
FIG. 19 is a schematic diagram of the components located in the camera for controlling the pan motor, focus motor, tilt motor and iris opening of the lens.
Figure 20:
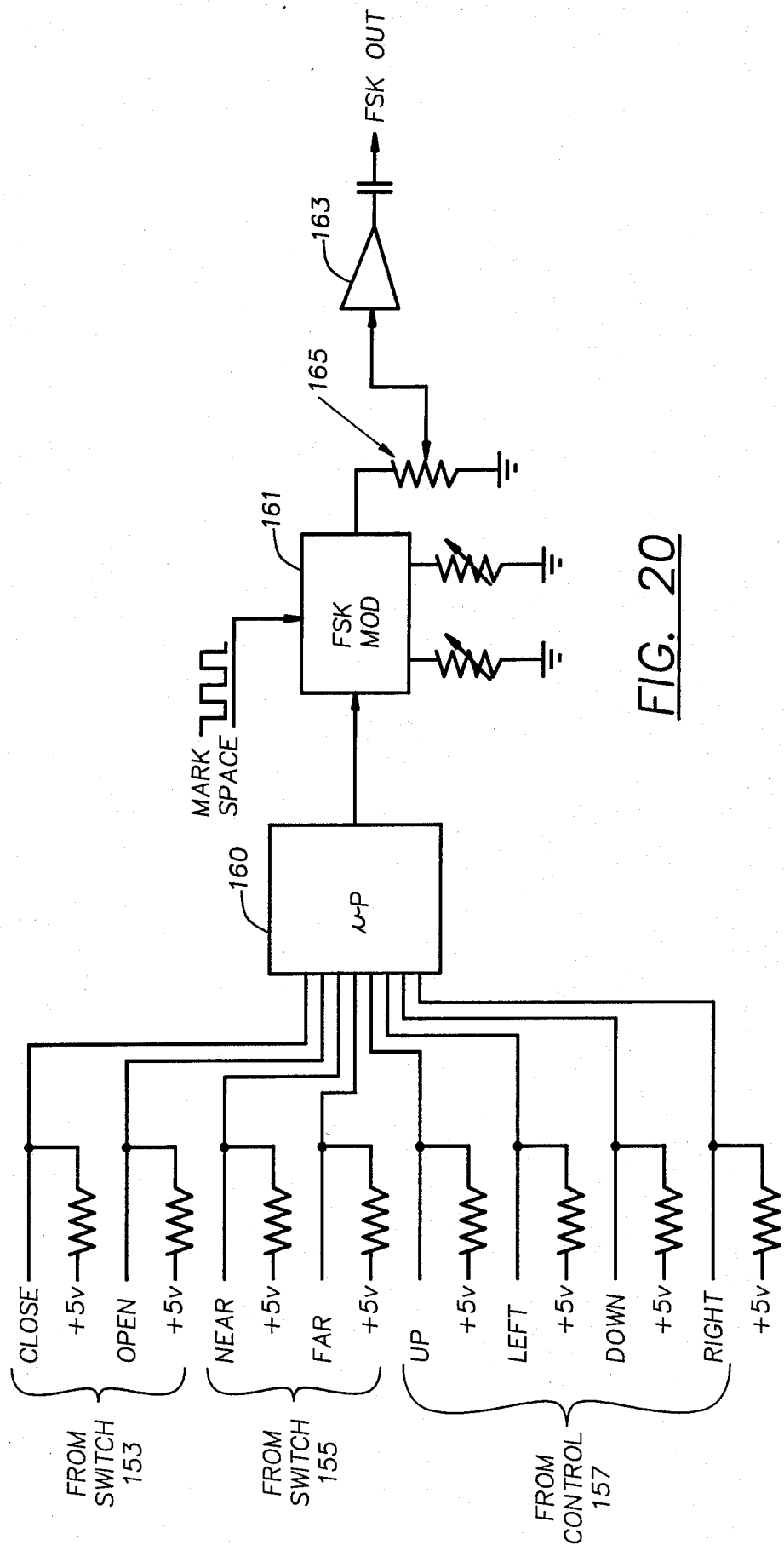
FIG. 20 is a schematic diagram of the circuitry employed at a controller for manually controlling the position, focus and opening of the camera lens.

The circuitry inside controller 149 is illustrated in FIG. 20 to which specific reference is now made. Located within the controller is a microprocessor 160 that receives indications of switch closures from the controls 153, 155 and 157 on front panel 150. Microprocessor 160 provides an appropriate output signal to a frequency-shift keying (FSK) modulator 161 at which the status of switches 153, 155 and controller 157 are coded for transmission via cable 151 (FIG. 21) to the camera assembly. Frequency-shift keying is a form of frequency modulation in which the modulating wave shifts the output frequency between predetermined values, the output signal having no phase discontinuity. Commonly, the instantaneous frequency is shifted between two discrete values termed the mark and space frequencies. Frequency-shift keying is a well-known coding technique for signal transmission, and the particular coding utilized herein does not constitute part of the present invention. The FSK OUT signal is utilized in the camera assembly in the manner described below in relation to FIG. 19.

Summarizing the operation of the circuitry of FIG. 20, the circuit reads the joystick and switch status, converts the resulting data into a serial data train, converts the digital data train to FSK form, and amplifies the FSK signal so that it may be transmitted via cable 151. Microprocessor 160 reads all of the switch and controller inputs and checks for valid data. If an iris command is sensed, the microprocessor also checks that the iris command has been there for a sufficiently long interval to warrant action (i.e., typically ten "read" cycles of the microprocessor). The final data is provided at the microprocessor output port to FSK modulator 161. The modulator converts the serial bit stream to a two-tone code. For example, a high level on the serial data is converted to 4.5 kHz, and a low data level is converted to 5.5 kHz. The level of the FSK signal delivered to output amplifier 163 may be adjusted by means of a potentiometer 165.

Essentially, the microprocessor defines various time slots in a multiple-bit word wherein the logic level (and subsequently the FSK tone status) determines whether a particular switch has been actuated at the controller panel. For example, after a predetermined start bit interval, successive intervals may be utilized to define the status of the eight switch functions shown as providing input signals to microprocessor 160 in FIG. 20. The status of the logic level, and subsequently the particular tone, in each of the defined intervals indicates whether a particular switch is open or closed.

Referring now to FIG. 19, the control signal transmitted from the controller in the circuit of FIG. 20 is received at the camera assembly as a signal designated FSK IN. The signal is passed through transformer 170 to a bandpass filter 171 tuned to pass the frequency-shift code tones. These tones are then passed to a demodulator 175 which receives a signal from oscillator 173 so that it may detect logic levels represented by the coded FSK tones and apply these logic levels to a microprocessor 177. Microprocessor 177 provides the output signals to control the various motors and the iris opening. In particular, output signals from microprocessor 177 are provided to a level shift circuit 178 that adjusts the amplitude of the output signals that are useful for controlling the pan motor 130, focus control motor 100 and tilt motor 110. Microprocessor 177 also provides an output signal to digital-to-analog converter 179 which in turn provides an input signal at the non-inverting input terminal of a differential amplifier 180. The output signal from amplifier 180 is applied to the iris control coils 140. The video output signal from the camera electronics unit 19 is converted to a d.c. level by d.c. converter 181 so that the d.c. level may be fed back to the inverting input terminal of differential amplifier 180. A parallel resistor-capacitor feedback path for amplifier 180 is also provided from the amplifier output terminal to the amplifier inverting input terminal.

The two microprocessors 160 and 177 are identical; microprocessor 160 serves a transmit function whereas microprocessor 177 serves in a receiver capacity. Both microprocessors are identically programmed, the source code program being listed in Appendix A. It is necessary for the particular microprocessor to determine where it is being utilized. If it is being utilized in the camera assembly, it is serving as a receiver; if it is utilized in the remote controller it serves the transmit function. Thus, after initialization of the various registers, ports, etc., the software makes this determination at steps 42, 43. If the microprocessor is in a transmitter, the program jumps to the transmitter routine. If the microprocessor is in the camera, the program continues on to the camera routine. In this manner, the microprocessor 160 and 177 are rendered interchangeable.

For microprocessor 160, the transmitting microprocessor, after initialization the various input signals from the switches 153, 155 and controller 157 are read. After certain data validation steps, the data is then supplied to modulator 161 for transmission. In the camera microprocessor 177, after certain initialization steps, the incoming control data is converted to a form useful for controlling the motors and the lens iris. Although the program listing is provided in Appendix A for reference purposes, it does not constitute part of the present invention.

The television camera of the present invention can be utilized in a variety of different environments and for a variety of different purposes. As indicated above, the camera has particular utilization in the inspection of pipelines (e.g., sewer lines) for leaks, defects, etc. Some pipelines are extremely narrow, thereby requiring an inspection camera to be narrow enough to fit in and be moved along the pipeline interior with an attached illumination lamp. In order to permit reasonably accurate visual inspection of the entire pipe interior circumference, the camera field of view must be movable accordingly, and control of the camera must be effected from remote locations. However, the mechanisms associated with such movability and remote control ability mitigate against reducing the diameter of the camera to a sufficiently narrow size for many pipeline applications. The present invention is able to provide a sufficiently narrow camera with the desired movable field of view controlled remotely. The important features of the invention that permit this desirable result are as follows:

1. The camera CCD detector 81 is removed from the camera electronics assembly 19 so that assembly 19 is not required to be positioned adjacent lens assembly 70 in front end 11. Assembly 19, if it were present in front end 11, would so crowd the front end as to preclude any meaningful range of lens movement. Therefore, the CCD detector 81 is mounted on the forward-facing side of the CCD circuit board 80 immediately behind lens assembly 70 so as to be movable with lens 70; on the other hand, the camera electronics assembly, from which the CCD detector 81 has been displaced, is disposed in cylindrical housing 10 and is positionally fixed.

2. The CCD board 80 is disposed as part of the gimbal-mounted equipment and is therefore movable with the lens. In this position the CCD board is able to serve as a tie point for wiring between gimbal-mounted equipment (i.e., tilt motor 110; focus control motor 100; lens iris control coils 140) and positionally fixed circuitry disposed in housing 10.

3. The focus control motor 100 and the tilt motor 110 are mounted on and movable with the inner gimbal 50. Since the inner gimbal tilts to effect field of view tilt, motors 100 and 110 tilt accordingly. Since the inner gimbal pans with the outer gimbal 37, motors 100 and 110 pan accordingly.

4. The pan function is controlled by a positionally fixed pan motor 130 utilizing a control cable 145 in the form of a pull wire to rotate the outer gimbal 37 with driven pulley 147. This permits the pan motor to be removed from the movable gimbal-mounted components and to be located rearwardly of the front end so as to reduce crowding in the front end with the result that there is more space for free movement of the lens.

5. The lens assembly 70 has its iris control electronics located remotely from the lens structure so as to permit a very small lens assembly to be employed. Lens assemblies having remote iris control circuitry are not unique. However, this feature, in combination with the features enumerated above, serves to permit the camera to be as small as required while having the necessary degrees of pan and tilt variation.

In an actual working embodiment of the camera of the present invention, housing 10 has a diameter of three inches, front end 11 at its widest part has a diameter of three and one-quarter inches, and the overall length of the camera, from the front of dome 30 to the rear of section 13, is twenty-two and three-eighths inches. The optical axis is movable over a 110° range in both pan and tilt (i.e., 55° in each of the four directions from the longitudinal axis LC). The resulting viewing coverage is 141° in vertical, 154° in horizontal and 165° in diagonal. The nominal speed of the pan and tilt functions is approximately 45° per second. The lens assembly 70 is an 8.5 mm auto iris lens having a maximum opening of f1.6. The focus control range is one inch to infinity. It will be appreciated that these specific parameter values are presented by way of example only and are not necessarily limiting on the scope of the present invention. However, it is believed that a television camera having a maximum diameter of three and one-quarter inches and 110° pan and tilt variations, controlled remotely, is unique.

The video signal derived by camera electronics assembly 19 from the image transduced into electrical signals by CCD detector block 81 is passed to the remote location for display on a conventional television monitor by means of a cable (not shown) that is separate from the cable 151 carrying the control signals. The video detection, processing and transmission functions are conventional and do not constitute part of the present invention.

From the foregoing description it will be appreciated that the present invention makes available a novel remotely controlled pan and tilt television camera that can be made extremely small without sacrificing the range of pan and tilt adjustment and which permits remote control of pan and tilt movement, lens focusing and iris opening.

Having described a preferred embodiment of a new and improved remotely controlled pan and tilt television camera in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed:

1. A television camera comprising:
   an elongated housing having a longitudinal axis and a front end covered by a transparent member;
   a first gimbal pivotably mounted in said front end for controllable rotation relative to said housing about a first axis oriented transversely of said longitudinal axis;
   a second gimbal pivotably mounted on said first gimbal for controllable rotation relative to said first gimbal about a second axis oriented transversely of said longitudinal axis and orthogonally of said first axis, said second gimbal being movable with said first gimbal about said first axis;
   a lens having an adjustable focus capability mounted on said second gimbal and having an optical axis oriented perpendicular to said first and second axes;
   a focus control motor mounted on and movable with said second gimbal for controllably changing the focus of said lens;
   a first motor positionally fixed in said housing for controllably rotating said first gimbal about said first axis relative to said housing;
   a second motor mounted on and movable with said second gimbal for controllably rotating said second gimbal about said second axis relative to said first gimbal;
   image transducer means, mounted in positionally fixed relation to said lens so as to be movable with said lens, for receiving optical images from said lens and converting the optical images to electrical signals; and
   electronic circuit means for converting said electrical signals to video signals suitable for display on a television monitor, said circuit means being disposed positionally fixed within said housing.

2. The television camera according to claim 1 further comprising a circuit board mounted on said second gimbal so as to be movable therewith, and wherein said image transducer means is a CCD detector mounted on said circuit board.

3. The television camera according to claim 2 wherein said lens has an electronically controlled iris, said camera further comprising iris control circuitry, disposed in positionally fixed relation in said housing and remote from said lens, for controlling said iris.

4. The television camera according to claim 3 wherein said first motor includes:
   a rotatable first motor drive shaft oriented parallel to said first axis;
   a drive pulley secured to and rotatable with said first motor drive shaft; and
   a drive cable having first and second ends and an intermediate portion, said first and second ends being secured in positionally fixed relation to said first gimbal at respective first and second locations on opposite sides of said first axis, and wherein said intermediate portion of said cable is secured to said drive pulley.

5. The television camera according to claim 4 wherein said first motor further includes:
   a drive pulley secured in positionally fixed relation to said first gimbal and substantially centered about said first axis, said drive pulley including a circumferential track in which said drive cable resides, wherein said first and second locations reside in said tracks.

6. The television camera according to claim 5 wherein said second motor comprises:
   a rotatable second motor drive shaft oriented parallel to said second axis;
   a drive gear secured to and rotatable with said second motor drive shaft; and
   a driven gear mounted in positionally fixed relation on said first gimbal in a position centered about said second axis so as to be engaged by said drive gear.

7. The television camera according to claim 6 wherein said circuit board serves as a tie point for all electrical wiring connections between components mounted on said second gimbal and components positionally fixed inside housing.

8. The television camera according to claim 7 wherein said first gimbal is an outer gimbal configured as a plate-like frame disposed about said second gimbal and within which said second gimbal is free to rotate about said second axis.

9. The television camera according to claim 2 wherein said circuit board serves as a tie point for all electrical wiring connections between components mounted on said second gimbal and components positionally fixed inside housing.

10. The television camera according to claim 9 wherein said first motor includes:
    a rotatable first motor drive shaft oriented parallel to said first axis;
    a drive pulley secured to and rotatable with said first motor drive shaft; and
    a drive cable having first and second ends and an intermediate portion, said first and second ends being secured in positionally fixed relation to said first gimbal at respective first and second locations on opposite sides of said first axis, and wherein said intermediate portion of said cable is secured to said drive pulley.

11. The television camera according to claim 2 wherein said second motor comprises:
    a rotatable second motor drive shaft oriented parallel to said second axis;
    a drive gear secured to and rotatable with said second motor drive shaft; and
    a driven gear mounted in positionally fixed relation on said first gimbal in a position centered about said second axis so as to be engaged by said drive gear.

12. The television camera according to claim 1 wherein said first motor includes:
    a rotatable first motor drive shaft oriented parallel to said first axis;

a drive pulley secured to and rotatable with said first motor drive shaft; and a drive cable having first and second ends and an intermediate portion, said first and second ends being secured in positionally fixed relation to said first gimbal at respective first and second locations on opposite sides of said first axis, and wherein said intermediate portion of said cable is secured to said drive pulley.

13. The television camera according to claim 12 wherein said first motor further includes:

a drive pulley secured in positionally fixed relation to said first gimbal and substantially centered about said first axis, said drive pulley including a circumferential track in which said drive cable resides, wherein said first and second locations reside in said tracks.

14. The television camera according to claim 1 wherein said second motor comprises:

a rotatable second motor drive shaft oriented parallel to said second axis;

a drive gear secured to and rotatable with said second motor drive shaft; and a driven gear mounted in positionally fixed relation on said first gimbal in a position centered about said second axis so as to be engaged by said drive gear.

15. The television camera according to claim 1 wherein said first gimbal is an outer gimbal configured as a plate-like frame disposed about said second gimbal and within which said second gimbal is free to rotate about said second axis.

16. The television camera according to claim 1 wherein said first and second axes and said longitudinal axis intersect at a common point, and wherein said lens is mounted such that said optical axis passes through said common point.

17. The television camera according to claim 16 wherein said focus control motor includes:

a focus control drive shaft oriented in fixed parallel relation to said optical axis;

a focal control gear secured to said focal control drive shaft; and a focus control gear secured to said lens and rotatable about said optical axis to adjust the focus of the lens;

wherein said focal control gear is positioned to engage said focus control gear in drivable relation.

18. The television camera according to claim 1 wherein the largest outside diameter of said television camera transversely of said longitudinal axis is no greater than three and one-quarter inches.

19. The television camera according to claim 18 wherein said first and second gimbals are each rotatable over a range of at least one hundred degrees about said first and second axes, respectively.

20. A television camera comprising:

an elongated housing having a longitudinal axis and a front end covered by a transparent member;

a lens having a selectively adjustable focus capability and an optical axis;

a first gimbal mounted for selective rotation about a first axis relative to said housing, said first axis being oriented orthogonally with respect to said longitudinal axis;

a second gimbal mounted on said first gimbal to be movable therewith and for selective rotation about a second axis relative to said first gimbal, said second axis being oriented orthogonally with respect to said longitudinal axis and to said first axis;

a focus control motor selectively actuable to adjust the focus of said lens;

a first gimbal drive motor selectively actuable for rotating said first gimbal about said first axis;

a second gimbal drive motor selectively actuable for rotating said second gimbal about said second axis; and image detector means for receiving optical images from said lens and converting the optical images to electrical signals;

wherein said lens, said focus control motor and said image detector means are all mounted in positionally fixed relation to said second gimbal so as to be movable therewith.

21. The television camera according to claim 20 further comprising:

electronic circuit means, positionally fixed in said housing, for receiving said electrical signals from said image detector means and converting the electrical signals to video signals suitable for display on a television monitor.

22. The method of inspecting a pipe line for defects from locations within the pipe line using a television camera housed in an elongated body having a transparent dome containing the camera lens at its forward end, said method comprising the steps of:

(a) moving the television camera longitudinally along the interior of the pipe line;

(b) from a remote location outside the pipe line, selectively varying the field of view of said camera in a first direction without moving the dome relative to the housing and without moving the dome and housing relative to the pipeline; and (c) from a remote location outside said pipe line, selectively varying the field of view of the camera in a second direction without moving the dome relative to the housing and without moving the dome and housing relative to the pipeline.

23. The method according to claim 22 further comprising the step of: from said remote location, selectively varying the focus of the camera lens.

24. The method according to claim 22 further comprising the step of: from the remote location, selectively varying the size of the iris opening of the camera lens.

25. The method according to claim 22 wherein step (b) comprises selectively rotating the camera lens within the dome about a vertical axis, and wherein step (c) comprises selectively rotating the lens within the dome about a horizontal axis.

26. The method according to claim 22 wherein the step (b) includes selectively rotating an outer gimbal, disposed within said dome, relative to said housing about a first axis, and wherein step (c) includes selectively rotating an inner gimbal, disposed within said dome, relative to said outer gimbal about a second axis orthogonally disposed relative to said first axis, wherein said lens is mounted on said inner gimbal and wherein said inner gimbal is mounted on said outer gimbal.

27. The method according to claim 26 further comprising the step of, from the remote location, selectively varying the focus of the lens by rotating the lens relative to the inner gimbal about an axis orthogonally disposed relative to said first and second axes.

* * * * *